(12) United States Patent
Dang et al.

(10) Patent No.: US 11,539,088 B2
(45) Date of Patent: Dec. 27, 2022

(54) ULTRA-THIN MICROBATTERY PACKAGING AND HANDLING

(71) Applicant: International Business Machines Corporation, Armonk, NY (US)

(72) Inventors: Bing Dang, Chappaqua, NY (US); Leanna Pancoast, White Plains, NY (US); Jae-Woong Nah, Closter, NJ (US); John Knickerbocker, Orange, NY (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 16/813,071

(22) Filed: Mar. 9, 2020

(65) Prior Publication Data
US 2021/0280834 A1 Sep. 9, 2021

(51) Int. Cl.
| | | |
|---|---|---|
| *H01M 50/10* | (2021.01) | |
| *H01M 10/052* | (2010.01) | |
| *H01M 10/04* | (2006.01) | |
| *H01M 50/116* | (2021.01) | |
| *H01M 50/543* | (2021.01) | |

(52) U.S. Cl.
CPC ....... *H01M 50/10* (2021.01); *H01M 10/0436* (2013.01); *H01M 10/052* (2013.01); *H01M 50/116* (2021.01); *H01M 50/543* (2021.01); *H01M 2220/30* (2013.01)

(58) Field of Classification Search
CPC .. H01M 50/10; H01M 50/116; H01M 50/543; H01M 10/0436; H01M 10/052
See application file for complete search history.

(56) References Cited

U.S. PATENT DOCUMENTS 5,362,579 A * 11/1994 Rossoll ............ H01M 6/12
429/162
5,771,562 A 6/1998 Harvey, III et al.
6,190,798 B1 2/2001 Okada et al.
(Continued)

FOREIGN PATENT DOCUMENTS

CN 104396079 A 3/2015
CN 107851831 A 3/2018

OTHER PUBLICATIONS

International Search Report, International Application No. PCT/IB2021/050783, dated Apr. 28, 2021, 3 pages.

*Primary Examiner* — Jane J Rhee
(74) *Attorney, Agent, or Firm* — Harrington & Smith

(57) ABSTRACT

Microbatteries and methods for forming microbatteries are provided. The microbatteries and methods address at least one or both of edge sealing issues for edges of a stack forming part of a microbatteries and overall sealing for individual cells for microbatteries in a batch process. A transferable solder molding apparatus and sealing structure are proposed in an example to provide a metal casing for a solid-state thin-film microbattery. An exemplary proposed process involves deposition or pre-forming low-temperature solder casing separately from the microbatteries. Then a thermal compression may be used to transfer the solder casing to each battery cell, with a handler apparatus in a batch process in an example. These exemplary embodiments can address the temperature tolerance constrain for solid state thin film battery during handling, metal sealing, and packaging.

12 Claims, 11 Drawing Sheets

(56) References Cited

U.S. PATENT DOCUMENTS

| | | |
|---|---|---|
| 7,727,601 B2 | 6/2010 | Burrows et al. |
| 7,846,579 B2 | 12/2010 | Krasnov et al. |
| 8,236,444 B2 | 8/2012 | Cui et al. |
| 8,420,252 B2 | 4/2013 | Shakespeare et al. |
| 8,679,674 B2 | 3/2014 | Liang et al. |
| 8,999,571 B2 | 4/2015 | Chiang et al. |
| 2007/0210459 A1 | 9/2007 | Burrows et al. |
| 2007/0238019 A1* | 10/2007 | Laurent ............ H01M 10/0436 29/623.5 |
| 2008/0003492 A1* | 1/2008 | Bates ................ H01M 10/0525 429/185 |
| 2018/0323472 A1 | 11/2018 | Chen et al. |
| 2019/0097182 A1 | 3/2019 | Chen et al. |

* cited by examiner

ULTRA-THIN MICROBATTERY PACKAGING AND HANDLING

BACKGROUND

This invention relates generally to battery design, construction, and use and, more specifically, relates to the handling, sealing, and packaging of microbatteries.

Microbatteries are small typically single-cell batteries that have wide use, including wearables such as wireless earbuds, earpods or hearing aids, watches, calculators, implantable devices such as pacemakers, and other products. The uses range from consumer products to medical and industrial uses.

Ultra-thin battery substrates, however, for microbatteries can be very fragile. Such ultra-thin batteries may be, e.g., thin-film Li-batteries ranging in thickness from 0.01 mm to 1 mm. It would be beneficial to address this and other issues with microbatteries.

SUMMARY

This section is meant to be exemplary and not meant to be limiting.

In an exemplary embodiment, a microbattery includes a microbattery structure formed in a stack. The stack comprises multiple surfaces. The microbattery includes a first terminal on one of the surfaces and coupled to an anode of a battery in the microbattery structure. The microbattery includes a second terminal on one of the surfaces and coupled to a cathode of the battery in the microbattery structure. The microbattery also includes a metal-containing film covering at least one of the surfaces of the stack.

An additional exemplary embodiment is a method for forming microbatteries. The method includes mounting a thin-film battery panel onto a handler, the thin-film battery panel comprising a stack having multiple microbattery structures formed therein. The thin-film battery panel has a surface on an adhesive layer, and the adhesive layer is on a release layer that is on the handler. The stack comprises layers of a substrate, a polymer, and a cover plate. The method includes cutting through multiple layers of the stack to at least partially separate the multiple microbattery structures, and molding solder on surfaces of the multiple layers of the stack that have been cut through. The method additionally includes singulating the multiple microbattery structures into corresponding individual microbattery cells.

Yet another exemplary embodiment is a method for forming microbatteries. This method includes mounting a plurality of individual cells comprising microbattery structures onto a handler. The microbattery structures include a stack comprising layers of a substrate, a polymer, and a cover plate. The mounting mounts the microbattery structures on a release layer on the handler. The method includes molding solder on surfaces of the plurality of individual cells and on exposed surfaces of the release layer to create solder-covered cells. The method also includes singulating the solder-covered cells into the plurality of individual cells. The singulating cuts through at least the solder and to the release layer to separate the individual cells. The method includes releasing the plurality of individual cells to form corresponding individual microbatteries.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As way of an introduction, ultra-thin battery substrates are very fragile. Such ultra-thin batteries may be, e.g., thin-film Li-batteries ranging in thickness from 0.01 mm to 1 mm. For instance, during formation and handling, these types of batteries typically require a process temperature window less than 180 C. A handling solution is needed for molding or sealing of large quantities of microbatteries in parallel. Additionally, hermetic or near hermetic packaging is desired for a microbattery. Hermetic edge sealing, however, requires metal deposition, and the microbattery is prone to shorting when electroplating is used. Thus, a dry process is preferred.

Figure 1:
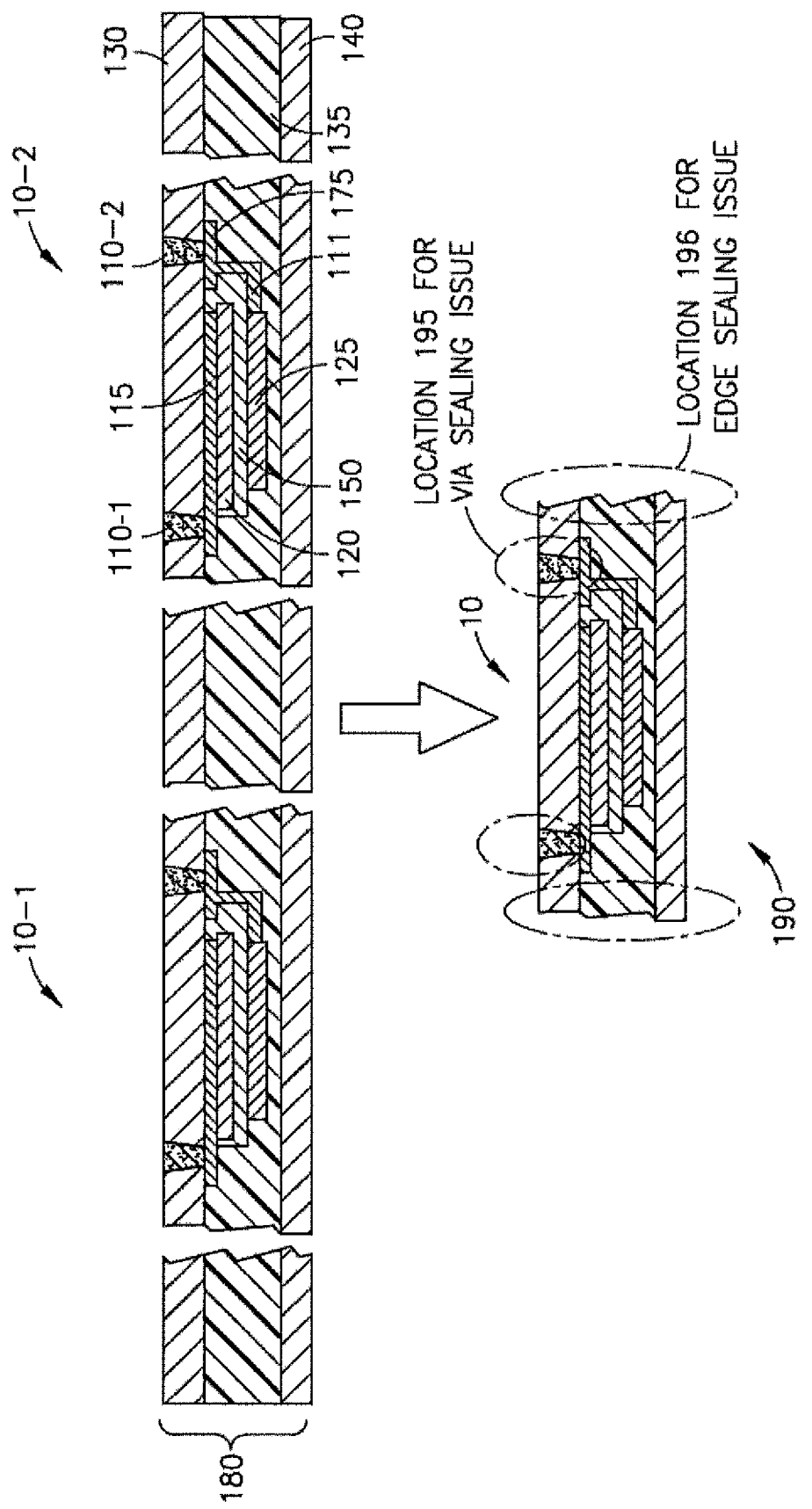
FIG. 1 illustrates hermetic edge sealing of microbatteries, which requires metal deposition, and where the microbattery is prone to shorting when electroplating is used.

Turning to FIG. 1, this illustrates hermetic edge sealing of microbatteries, which requires metal deposition, and where the microbattery is prone to shorting when electroplating is used. Two microbattery structures 10-1, 10-2 are illustrated in the top portion and the microbattery structure 10-2 is illustrated after cutting the wafer. Only the elements of the microbattery structure 10-2 are labeled, but the other microbattery structure 10-1 is similar. The microbattery structure 10-2 comprises two through-vias 110-1 and 110-2, a current collector 115, a cathode 120 that is formed at least partially within a solid-state electrolyte 150, and an anode 125 formed at least partly outside the electrolyte 150 but abutting the electrolyte. A via 111 electrically couples the anode 125 to the contact 175, which itself is electrically coupled to the through-via 110-2. The current collector 115 is electrically coupled to the through-via 110-1. These are formed in a stack 180 comprising a substrate 130, a polymer (e.g., a sealing adhesive) 135 and a cover plate 140. The cover plate can be ultra-thin ceramic, glass, silicon, high temperature metal film or inorganic 2D layered film such graphene film composite. The substrate can be, e.g., ultra-thin ceramic, glass, silicon, high temperature metal film, or inorganic 2D layered film such graphene film composite. Typically, the cover plate and the substrate are made of the same material to avoid stress, although this is only one option.

FIG. 1 illustrates that after a single microbattery 10 has been mainly formed as a cell 190, there are two locations where sealing can be problematic. One is the location 195 for a via sealing issue. Another is location 196, for an edge sealing issue.

A thin film battery substrate with hermetic via connection has addressed the via sealing problem. However, the edge sealing issues are still not resolved. These issues should be addressed.

The exemplary embodiments herein address these and other issues. That is, exemplary embodiments herein address at least one or both of the edge sealing issues and overall sealing for individual cells in a batch process.

In certain exemplary embodiments, a transferable solder molding apparatus and sealing structure are proposed to provide a metal casing for a solid-state thin-film microbattery. An exemplary proposed process involves deposition or pre-forming low-temperature solder casing separately from the microbatteries. Then a thermal compression may be used to transfer the solder casing to each battery cell, with a handler apparatus in a batch process. These exemplary embodiments can address the temperature tolerance constrain for solid state thin film battery during handling, metal sealing, and packaging.

In one example, first, suitable handler (glass, Si, kapton film, and the like) is prepared for the deposition of low-temperature solder (Indium, Indium-Sn, Indium-Sn-Bismuth, and the like) to match with the array of microbatteries. Then a thermal compress process with alignment is applied to bond the template to the microbattery substrate. The template is then released. Each individual battery cell is then sealed with metal casing hermetically.

Figure 2:
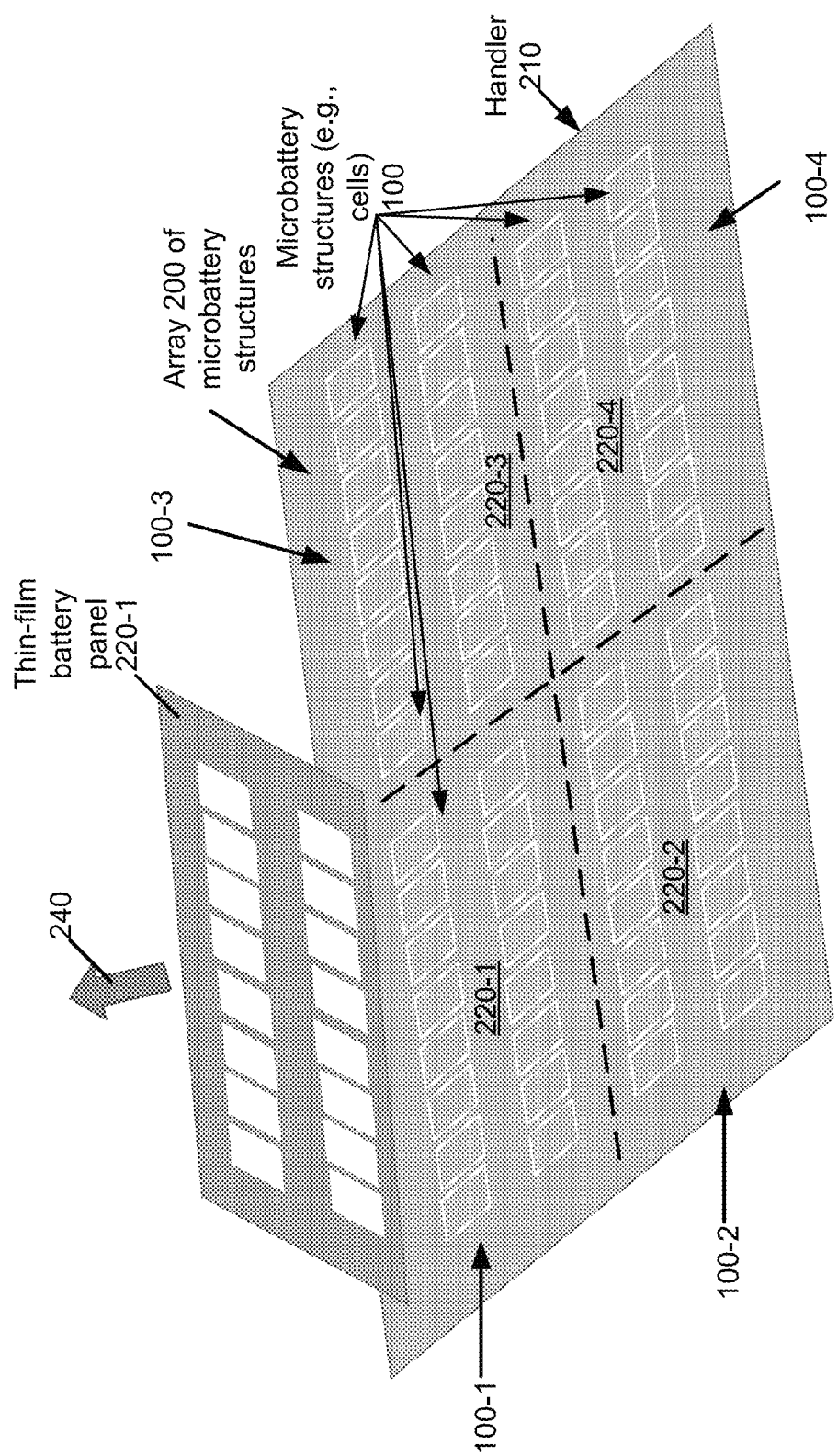
FIG. 2 is an illustration of an exemplary proposed approach of multiple panel transfer.
Figure 3:
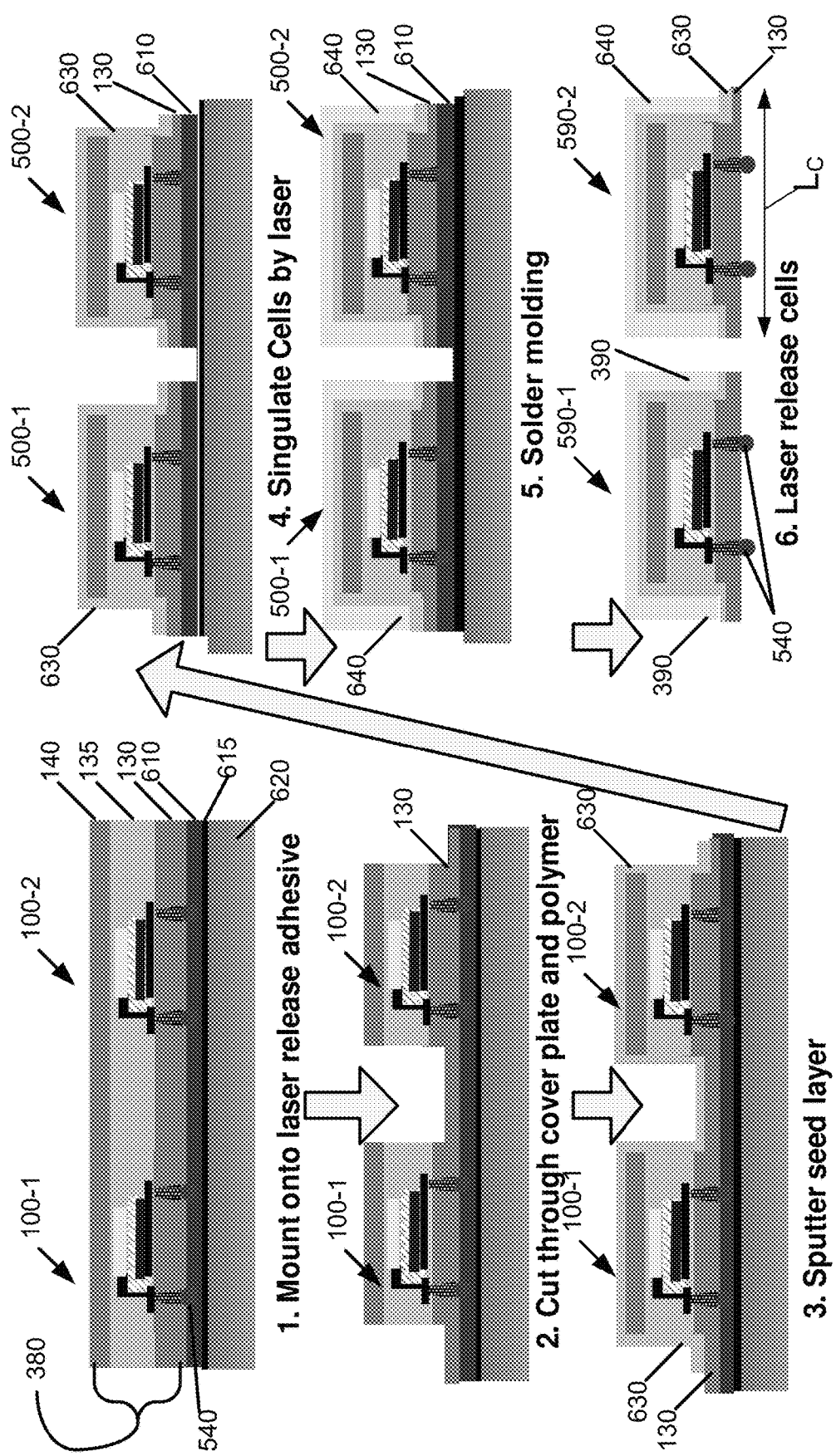
FIG. 3 illustrates an exemplary embodiment with a partial cut before metal.
Figure 4:
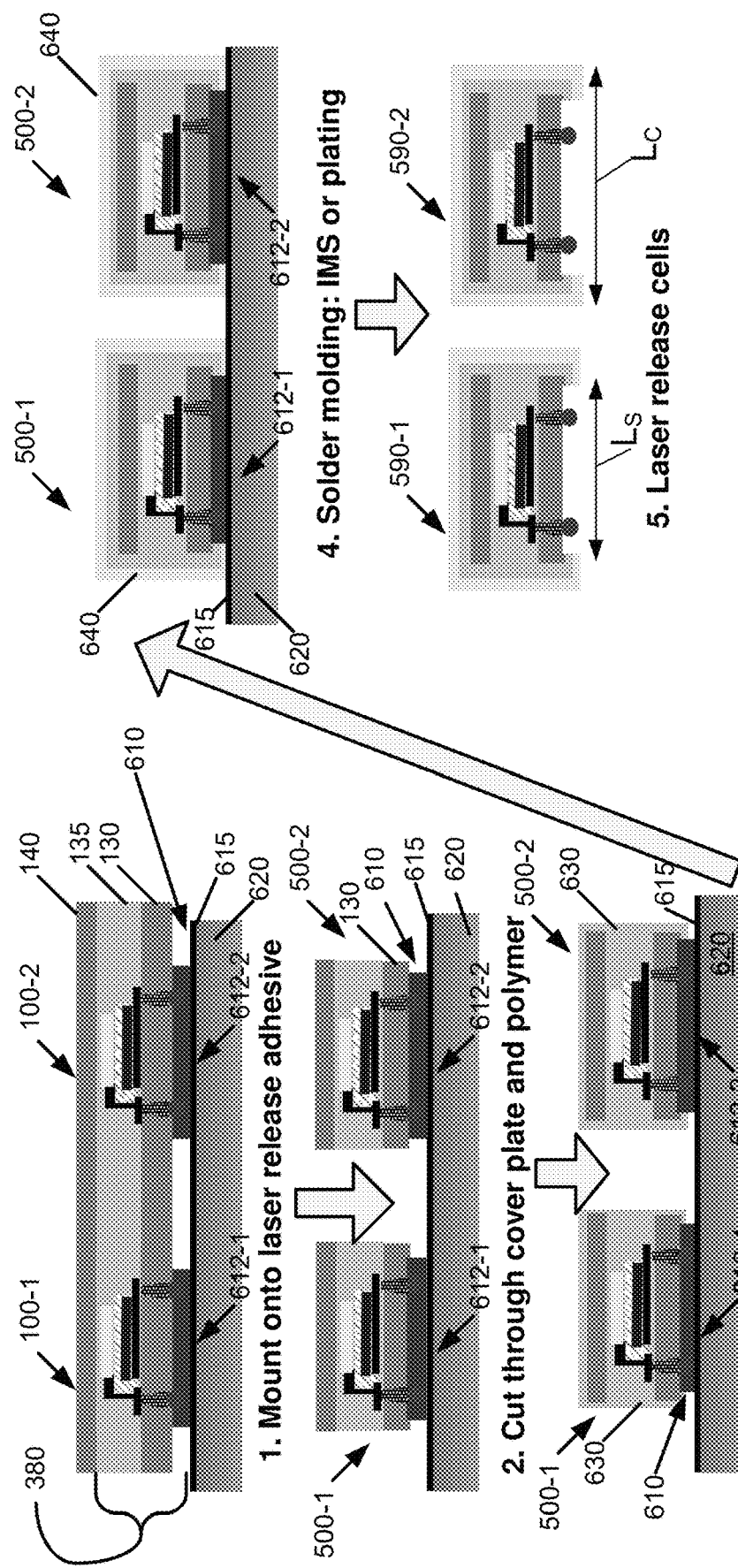
FIG. 4 illustrates an exemplary embodiment with a full cut before metal.
Figure 5:
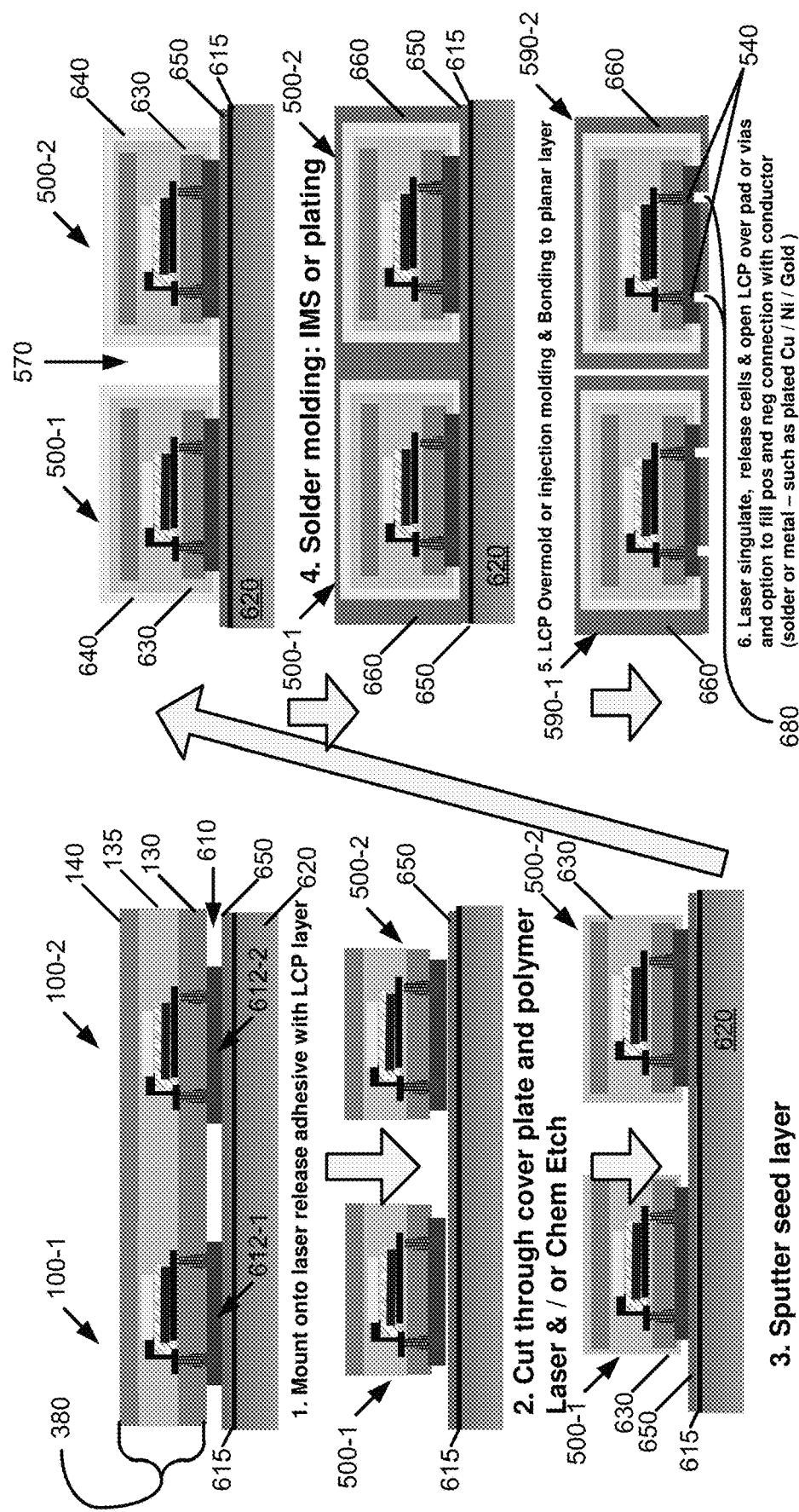
FIG. 5 illustrates other exemplary embodiment with a full cut before metal and final Liquid Crystal Polymer (LCP) encapsulation.
Figure 6:
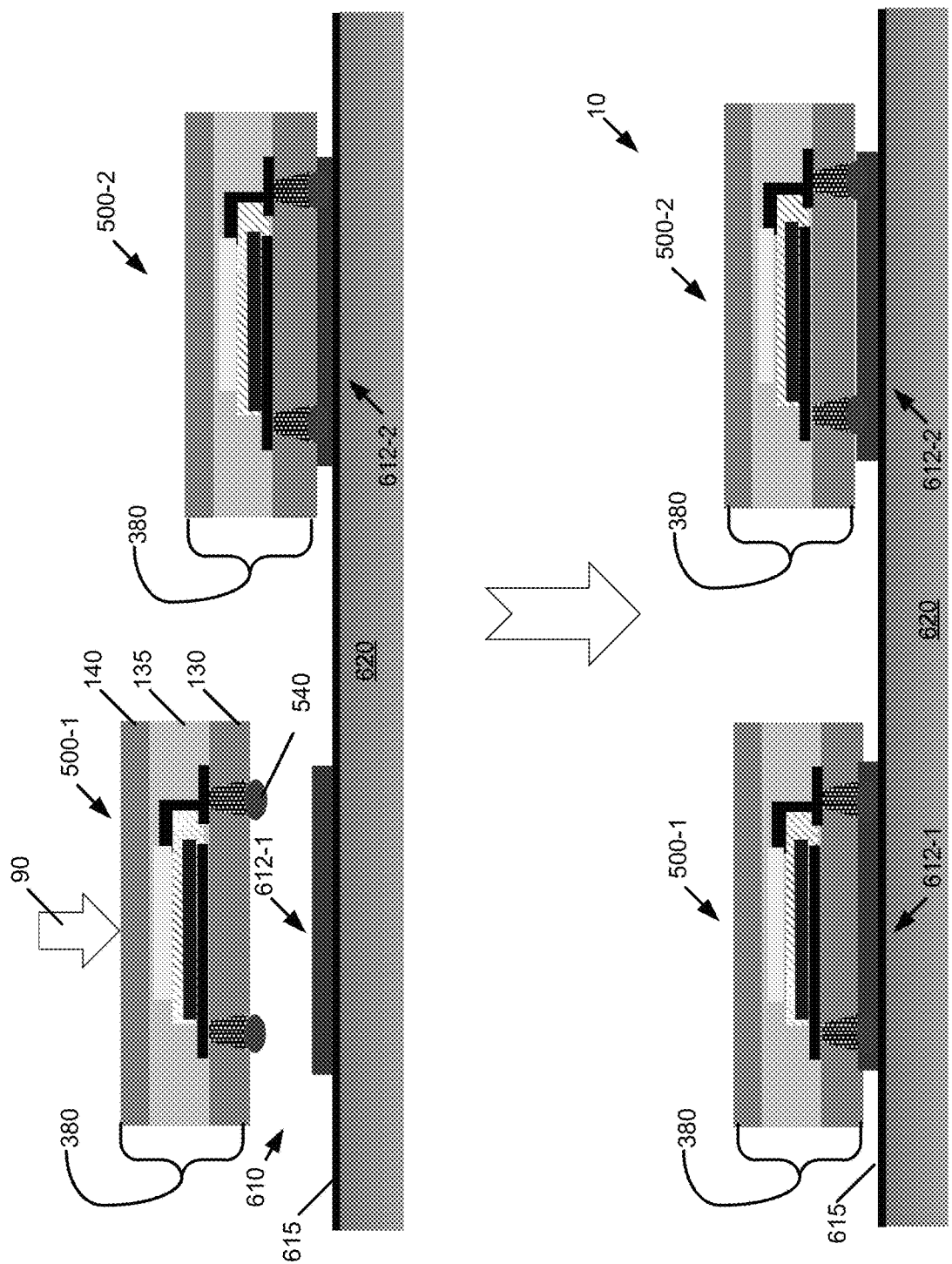
FIG. 6 illustrates another embodiment of picking and placing sorted cells onto a glass handler.
Figure 7:
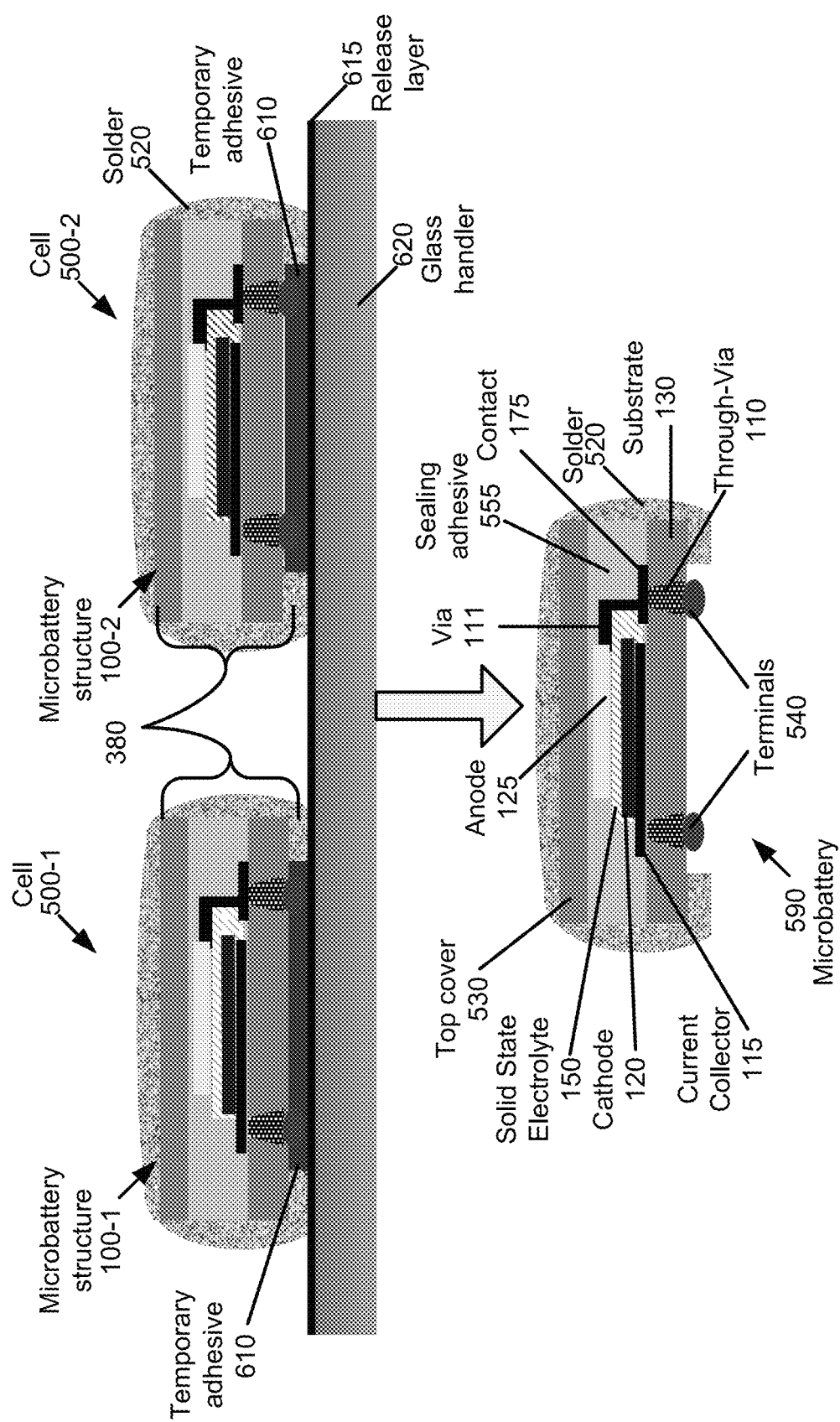
FIG. 7 illustrates solder molding around the cells, in an exemplary embodiment.
Figure 8:
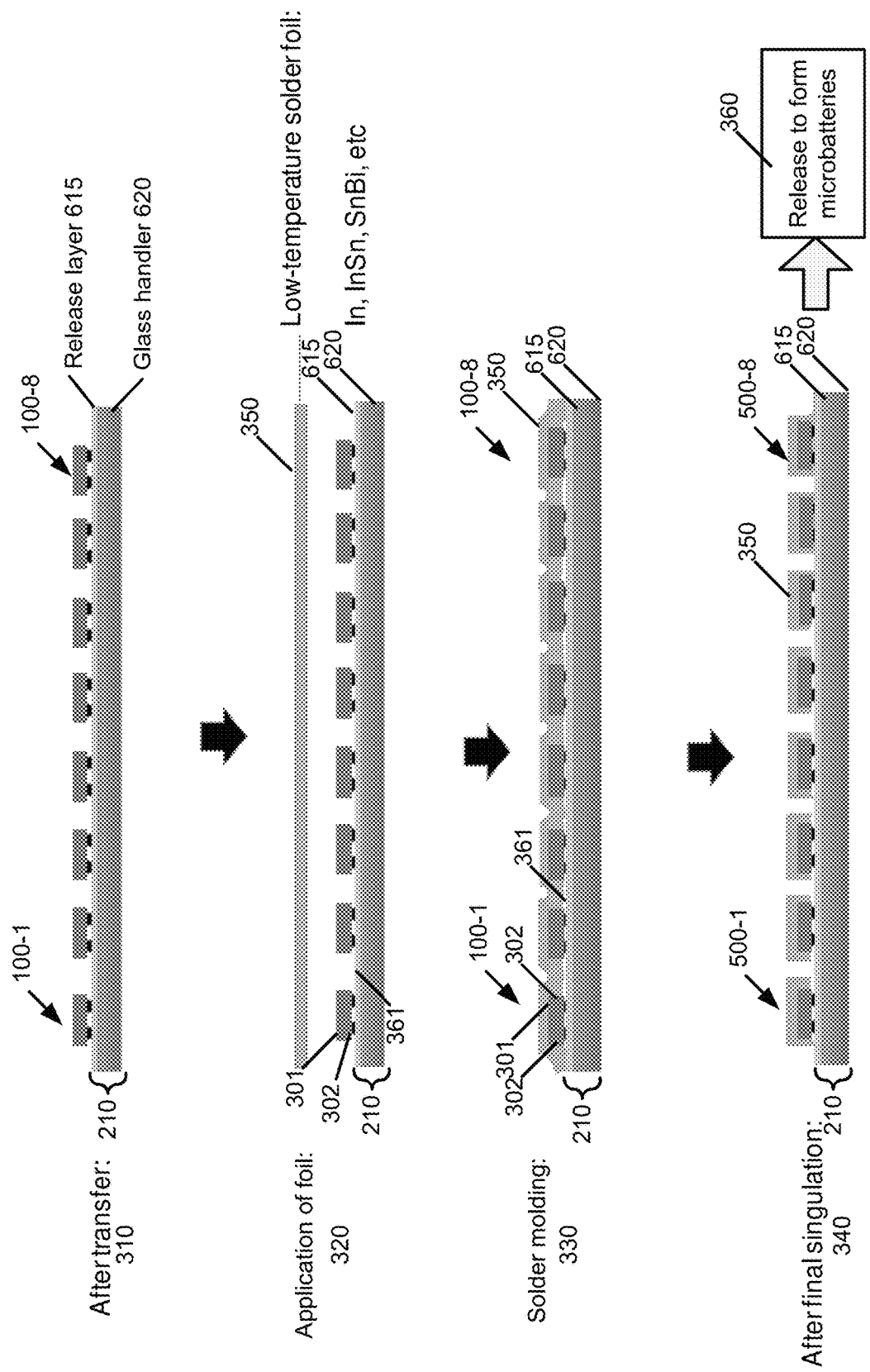
FIG. 8 is an illustration of steps taken during an exemplary hot embossing/solder molding and singulation.
Figure 9:
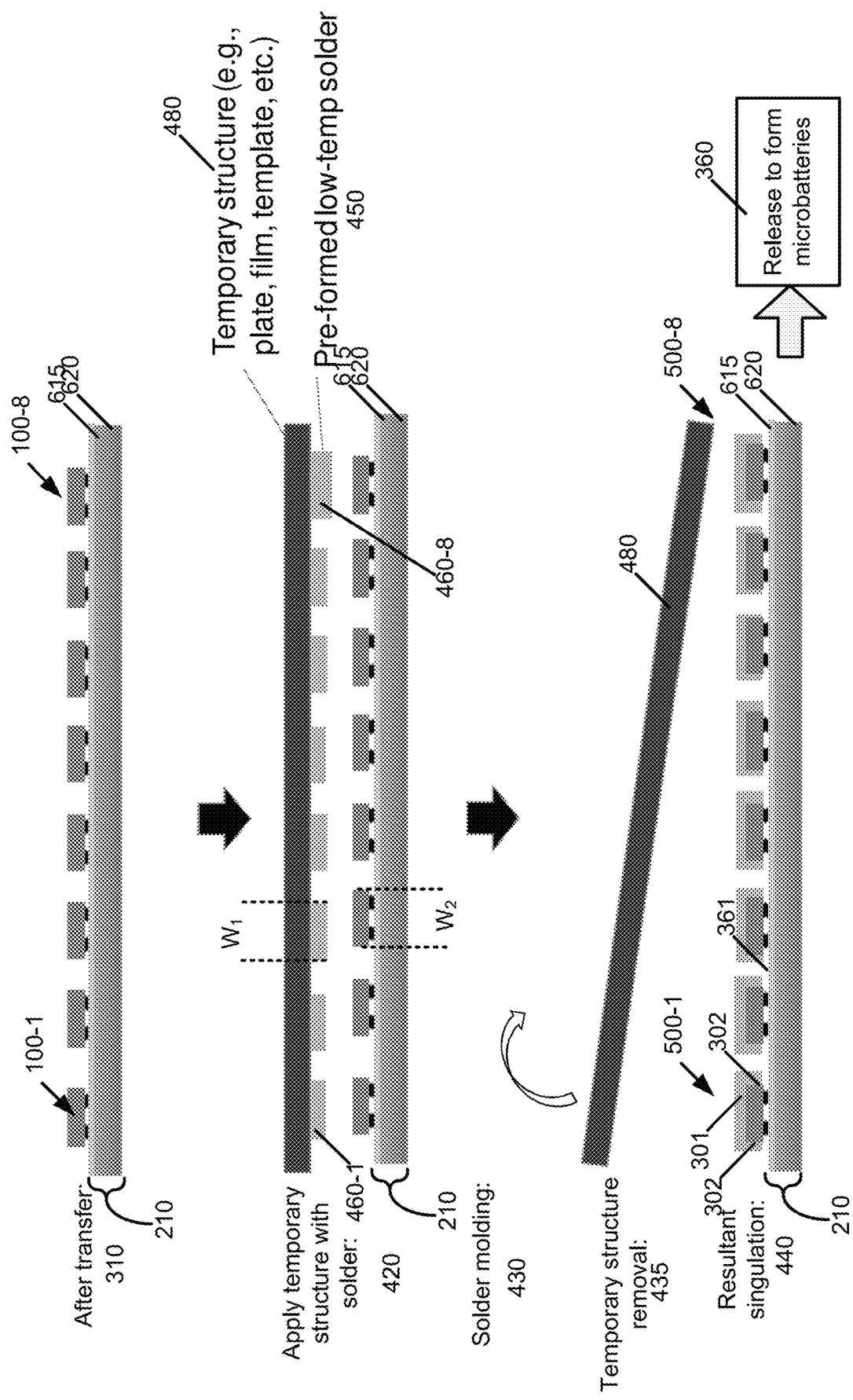
FIG. 9 illustrates an alternative technique for hot embossing/solder molding and singulation, in an exemplary embodiment.
Figure 10:
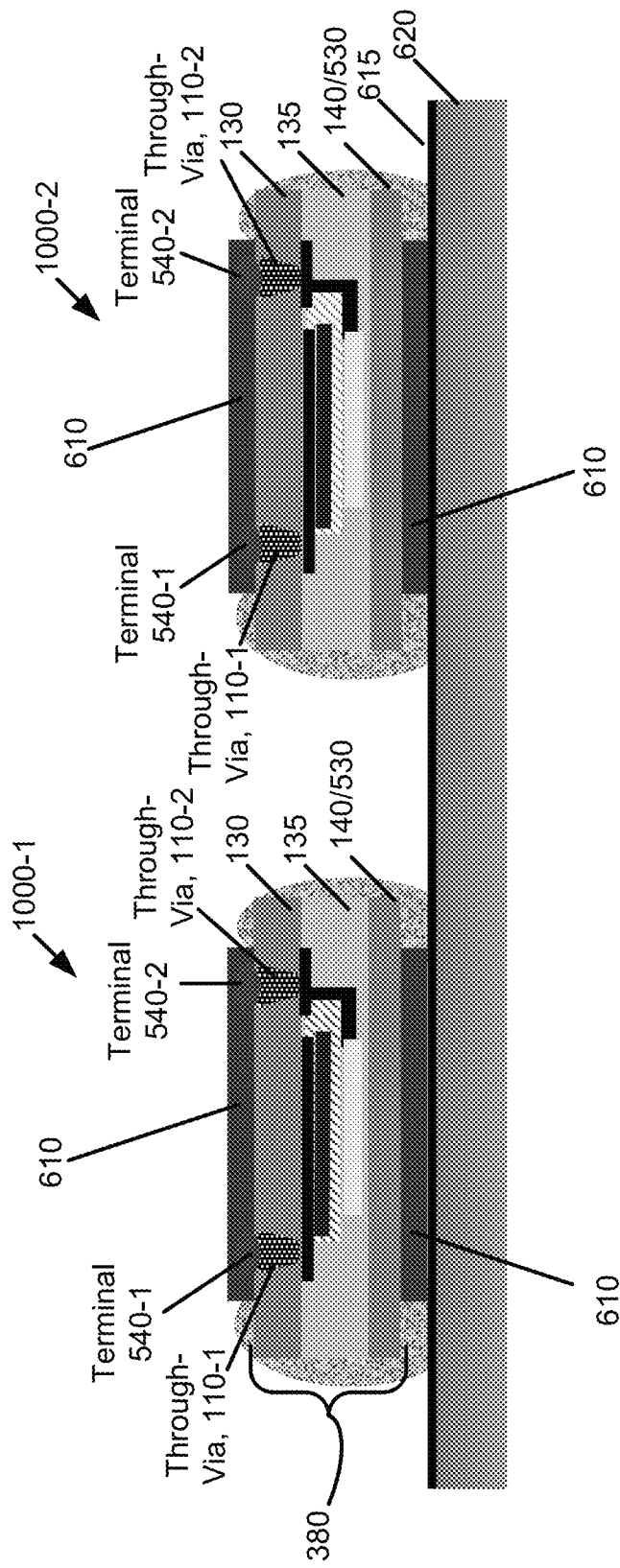
FIG. 10 is an exemplary embodiment where the microbattery structure formation process is performed with "face up" microbatteries.
Figure 11:
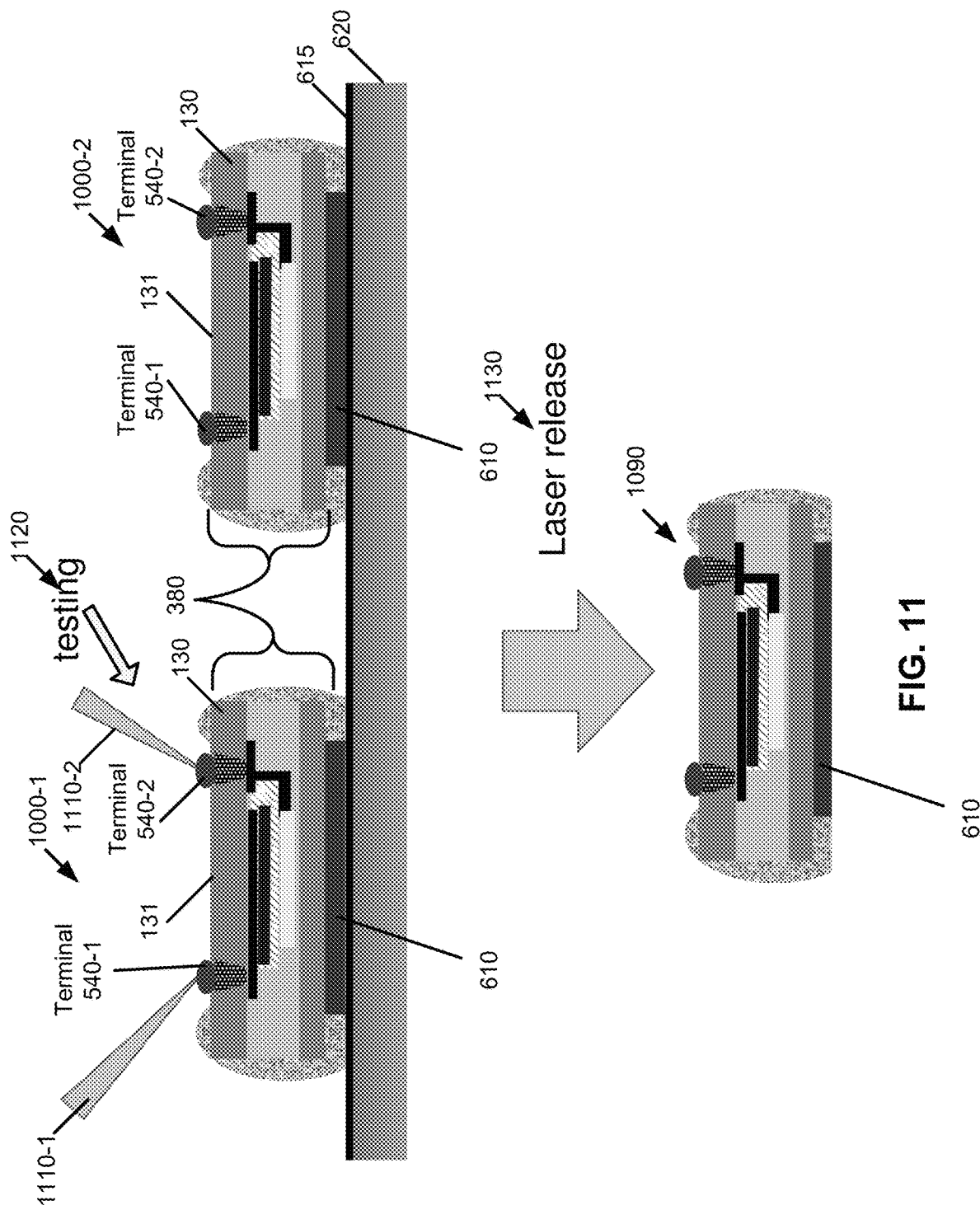
FIG. 11 illustrates that the face up approach as in FIG. 10 can facilitate testing.

The rest of this disclosure may be separated into broad categories as follows. FIG. 2 illustrates how panels such as thin-film battery (or more typically, microbattery) (TFB) cells may be transferred to a handler via thin-film battery panel transfer. FIGS. 3, 4, and 5 illustrate different processes to create cells with edge (and overall) sealing. These approaches are for TFB (thin-film battery or, more commonly, "microbattery") panels, and differ in at least their approaches to when "partial" or "full" cuts are performed though a stack into which microbattery structures are formed. FIG. 6 illustrates how individual cells (also referred to a microbattery structures) may be transferred onto a handler. FIGS. 7, 8 and 9 illustrate different processors for sealing edges and potentially overall sealing using solder molding around cells. These approaches are for singulated and sorted cells. FIG. 7 shows a detailed structure after solder molding. FIG. 8 describes an approach with solder film. FIG. 9 describes an approach with solder transfer. FIGS. 10 and 11, where the microbattery structure formation process is performed with "face up" microbatteries.

Turning to FIG. 2, this figure is an illustration of an exemplary proposed approach of multiple panel transfer. An array 200 of microbattery structures 100 is illustrated on a handler structure 210. FIG. 2 illustrates an exemplary embodiment of microbattery cell transfer to a handler structure 210 (which below is considered to includes a glass handler, but this is merely one example, and Si, kapton film, and the like might be used), where a part 100-1 of the array 200 has been placed by the thin film battery panel, where the thin film battery cells (referred to in FIG. 2 as microbattery structures) are initially built on. Reference 240 indicates that the thin film battery panel 220 is removed after the structures 100 in the area 100-1 are transferred to the handler structure 210 and have been processed to create individual cells, illustrated as microbattery structures 100. Exemplary processing to create individual cells is described below. Note that the thin-film battery panel 220 can be removed (as in reference 240) but also placed onto the handler structure 210. In this example, there are four panels 220-1 through 220-4 in corresponding areas 100-1 through 100-4.

In additional detail, the cells (the microbattery structures 100) were formed in the panel 220-1, and panels 220-1 through 220-4 in this example are attached on the handler 210. After cutting, each panel is removed and cells are left.

In terms of terminology, the term "cell" is used herein to denote a microbattery structure that has been encapsulated on its sides and is separated from other microbattery structures. This is done without limitation, however, as it is possible refer to the microbattery structures 100 as "cells" since they are separated. For clarity, however, the microbattery structure and cell definitions are used herein. It should be noted that with these definitions, a cell would contain a microbattery structure (e.g., and its corresponding stack 380).

Turning to FIG. 3, this figure illustrates an exemplary embodiment with a partial cut before metal. In particular, there is a partial cut in step 2 that is before a (metallic) solder molding process in step 4. In step 1, the stack 380 of a thin film microbattery structure, which includes two microbattery structures 100-1 and 100-2, in this example, is mounted onto a temporary adhesive 610, which is itself mounted (or formed) onto a laser releasable coating layer 615, which is also mounted (or formed) on a glass handler 620. In step 2, there is process of cutting through the cover plate 140 and polymer (e.g., sealing adhesive) 135, and partially into the substrate 130. Such cutting may be performed by a programmed laser beam scan with vision alignment. In step 3, a seed layer 630 is sputtered. In step 4, cells 500-1 and 500-2 are created via using a laser to singulate the microbattery structures 100-1 and 100-2 into cells 500-1 and 500-2. The seed layer 630 might be, for instance, titanium (about 300 Å, where Å is angstrom) and copper (about 1000 Å, angstrom). A Ti/Cu stack is a typical seed layer for plating for soldering. A terminal 540 is also marked, and one terminal 540 is shown for each through-via 110 (which are not marked in this figure).

In step 5, a solder molding process is performed. Layer 640 is formed via this process. In step 6, a layer release process releases the cells 500-1, 500-2 to become microbatteries 590-1, 590-2. A microbattery herein is considered to be a cell that has been released from a handler and is separate from the handler. Note this should not be considered to be limiting, as the cells 500 could potentially be used as batteries even if not released from the handler 620, but this terminology will be adhered to herein for clarity.

It is noted that edges 390 of the cells (e.g., the microbatteries) 590 have thinner portions of the substrate 130 (due to the cutting that occurred in step 2) adjacent the edges, and a thicker portion toward a center of the length $L_C$ of the cell. The length $L_C$ of the cell is illustrated, and a face side of the cell has the terminals 540.

FIG. 4 illustrates an exemplary embodiment with a full cut before metal. This embodiment is similar, but different from, to the embodiment in FIG. 3 in certain respects. For instance, comparing FIG. 4 with FIG. 3, there is a full cut through the substrate 130 in step 2, and a full cut through the substrate 130 does not occur in FIG. 3 until step 4. Again, such cutting may be performed by a programmed laser beam scan with vision alignment. Another difference is that in step 1 of FIG. 3, the stack 380 is mounted onto a temporary adhesive 610, but in this example, the temporary adhesive 610 has been patterned into islands 612-1, 612-2, each of which is positioned to align substantially with and formed to be under and cover the corresponding microbattery 100-1, 100-2 and their resultant cells 500-1, 500-2 after the cutting performed in step 2. The alignment and formation need not be "perfect", but should allow for proper singulation in steps 2-5. In step 2, a process is performed to cut completely through the substrate 130 and polymer 135 (and cover plate 140). This results in cells 500-1 and 500-2, which are still attached to the glass handler 620.

In step 3, the seed layer 630 is sputtered onto the exposed surfaces. In step 4, a solder molding process is performed, which may be IMS (Injection-Molded Solder) or plating, to form layer 640. The final step of this part of the processing flow occurs in step 5, where the laser is used to release the cells 500-1, 500-2 from the laser releasable coating layer 615 and create individual corresponding microbatteries 590-1, 590-2. It is noted that for this and other steps where a laser is used to release cells, some cleaning may be performed, e.g., to remove residual laser resealable coating layer and the temporary adhesive. There are two approaches of cleaning, e.g., depending on the thickness to be removed: 1) Low power laser ablation scanning to remove the adhesive (e.g., thinner materials), and/or 2) Oxygen plasma etch (e.g., thicker materials).

The length $L_C$ of the cell is illustrated, and a face side of the cell has the terminals 540. The length $L_S$ of the stack is also illustrated.

Turning to FIG. 5, this figure illustrates other exemplary embodiment with a full cut before metal and final Liquid Crystal Polymer (LCP) encapsulation. In step 1, the stack 380 is mounted onto a temporary adhesive 610 (using islands 612-1 and 612-2) with an LCP layer 650 on the glass handler 620. In step 2, a process is use to fully cut through the substrate 130 and polymer 135 (and cover plate 140). This can be a laser and/or chemical etch process. This is the "full cut" and forms the cells 500-1 and 500-2. In step 3, a process is used to sputter the seed layer 630 over the exposed surfaces. In step 4, a solder molding process such as IMS or plating is performed to form layer 640.

The process in FIG. 5 then performs (see step 5) LCP overmolding (a process where a single part is created using two or more different materials in combination) or injection molding (a manufacturing process for producing parts by injecting molten material into a mold) and bonding to the planar layer, which forms LCP layer 660 over the exposed surfaces, including bonding with LCP layer 650. The bonding may involve other operations, such as heating to a certain temperature range for a certain time period. This bonding basically creates a single polymer film, 660+650. The overmolding therefore structurally connects the two cells 500-1, 500-2 via the LCP layer 660 and fills previously unfilled areas 570 that existed between the previously singulated cells 500.

In step 6, a laser singulating process is used, which releases cells 500-1 and 500-2 to form corresponding microbatteries 590-1, 590-2, and opens the LCP layer 650 over pads or vias. This example shows openings 680 over the through-vias 110 and to at least some portion of the terminals 540. There is an additional option to fill positive (pos) and negative (neg) connections (i.e., the openings 680) with conductor (solder or metal—such as plated Cu/Ni/Gold).

Turning to FIG. 6, this figure illustrates another embodiment of picking and placing sorted cells onto a glass handler. This further illustrates use of temporary adhesive to hold singulated cells. In this example, the cell 500-2 has already been placed onto an island 612-2 of temporary adhesive 610, and reference 90 indicates an arm for picking and placing is placing the cell 500-2 onto the island 612-1 of the temporary adhesive 610. This results in (see reference 10) sorted cells 500-1, 500-2 placed onto the temporary adhesive 610, which itself is on laser releasable coating layer 615 of the glass handler 620.

FIG. 7 illustrates solder molding around the cells 500-1, 500-2, in an exemplary embodiment. For FIG. 7, cells 500-1 and 500-2 have been formed through processing and are separated versions of the corresponding microbattery structures 100-1, 100-2. That is, microbattery structures 100-1, 100-2 are formed using layers and are separated using singulation into the corresponding cells 500-1, 500-2. The cells 500-1 and 500-2 are illustrated as being formed on the release layer 615, which itself is formed on a glass handler 620. The cells 500-1, 500-2 are attached to the release layer 615 via temporary adhesive 610. The temporary adhesive 610 is under a portion of a cell 500 that is a void and not covered by solder 520.

There are a number of options for solder molding as illustrated in FIG. 7, including one or more of the following: the use of temporary adhesive; the use of injection molding; or the use of preformed metal foil. Note that the temporary adhesive 610 could be added through techniques herein, such as in islands 612, or via a layer and patterning. In more detail, temporary adhesive is only used to hold the cells temporarily to allow the solder molding processes. Temporary adhesives may be dispensed by one or more of a syringe, printing, a stencil, spray coating, or photolithographic patterning. This applies to all embodiments herein where temporary adhesives 610 are used.

Injection molding means injecting solder alloy around the cells, through known injection molding techniques. Preformed metal foil is another possible technique described also with respect to other figures, but uses preformed metal foil that is applied to the cells (e.g., see FIG. 8, described below).

After release from the release layer 615, each of the cells 500-1 and 500-2 would become a microbattery, although only a single microbattery 590 is illustrated. The reference numbers used before, such as in FIG. 1, are used herein for ease of reference and clarity. That is, similar elements are marked with the same reference number, although the elements may only be similar and may have differences, such as in composition. The microbattery 590 (and corresponding cell 500-1 or 500-2) comprises the following, all covered by the solder 520: a top cover 530; an anode 125; a sealing adhesive 555; a solid-state electrolyte 150; a cathode 120; via 111, a contact 175, and a current collector 115. All of these elements are formed on the substrate 130, which is partly surrounded by the solder 520. The terminals 540 are shown, as are the through-vias 110 which extend through the substrate 130 to contact either the current collector 115 or the contact 175. The cathode 120 that is formed at least partially within the solid-state electrolyte 150, and the anode 125 formed at least partly outside the electrolyte 150 but abutting the electrolyte 10. A via 111 electrically couples the anode 125 to the contact 175, which itself is electrically coupled to the through-via 110-2. The current collector 115 is electrically coupled to the through-via 110-1. The top cover 530 is a cut version of the cover plate 140 shown in FIG. 1. The sealing adhesive 555 is an example of the polymer 135 of FIG. 1.

FIG. 8 is an illustration of steps taken during an exemplary hot embossing/solder molding and singulation. A (part of a) handler structure 210 is illustrated, after transfer in step 310. The "after transfer" term means after transfer of the microbattery structures 100 as in FIG. 2 or 6 onto the glass handler 620. That is, the thin film microbattery structure is built on a panel first, then these microbattery structures are singulated and transferred onto a glass handler. The handler structure 210 comprises in this example a release layer 615 and a glass handler 620. Eight microbattery structures 100-1 through 100-8 are illustrated in this example. In step 320, there is an application of foil 350 to the tops of the structures 100. The low-temperature solder foil can be In, InSn, SnBi, Indium-Sn-Bismuth, and the like. For example, the melting point of In is 157C and the melting point of InSn is 119C. Low temperature solder may be defined, e.g., as meaning less than 160C. Top surface 301 and side surfaces 302 of the microbattery structures 100 are indicated, as is top surface 361 of the release layer 615.

In step 330, there is a solder molding operation (which could also be, e.g., a hot embossing operation), which causes the solder foil 350 to mold to the surfaces 301, 302, and 361. As is known, in a molding process, molten solder is injected to the surface and the solder will flow to fill any gap, and a compression process is then applied to form the final shape. In hot embossing, a pre-formed thin solder film is first laminated over the top surface. As temperature increases, the solder film will melt and flow to any gaps. Each individual battery cell is then hermetically sealed with metal casing. Step 340 illustrates the result after final singulation, e.g., via laser cutting, where each of the microbattery structures 100-1 through 100-8 is separated into corresponding cells 500-1 through 500-8. After this (or after additional processing), a release process is performed in block 360 to form microbatteries.

Referring to FIG. 9, this figure illustrates an alternative technique for hot embossing/solder molding and singulation. This technique starts after transfer 310. In step 420, a temporary structure 480, which may be a plate, film, template, or the like is applied to the handler structure 210 with the microbattery structures 100 on the structure 210. There is pre-formed (and pre-patterned) low-temperature solder 450 added as islands 460-1 to 460-8. The application in step 420 is performed to substantially align the islands 460-1 through 460-8 with the corresponding microbattery structures 100-1 through 100-8. That is, step 330 is in an exemplary embodiment an illustration of a thermal compress process with alignment that is applied to bond the temporary structure 480 comprising the islands 460 to the microbattery substrate. The structure 480 is then released in step 435. The pattern and width $W_1$ of the blobs 460 is designed relative to the pattern and width W2 of the microbattery structures 100 so that after solder molding in step 430, the solder 450 encapsulates each microbattery structure 100 after the temporary structure removal 435 and after the resultant singulation 440. That is, the sides 302 of the microbattery structures 100 are encapsulated to the top surface 361 of the release layer 615, and the top surface 301 is also encapsulated, but there is singulation of the microbattery structures 100-1 to 100-8 into corresponding cells 500-1 to 500-8. Also, the solder molding 430 is defined and performed to enable this encapsulation. That is, the pre-formed solder islands will define the total volume and thickness of molding. After singulation (or after additional processing), a release process is performed in block 360 to form microbatteries.

FIG. 10 is an exemplary embodiment where the microbattery structure formation process is performed with "face up" orientation for microbatteries. The previous examples used "face down" orientation for microbatteries, where the "face" includes the through-vias 110-1 and 110-2. In those examples, the "face" was "down", being toward the surface of the substrate 130. In "face up" microbattery orientation, the face, including the vias 110-1 and 110-2 and corresponding terminals 540-1, 540-2, is away from the surface 1010 of the substrate 130. See FIG. 9 and the cells 1000-1 and 1000-2. Only FIG. 9 can be applied to this exemplary embodiment, also the pre-defined solder frames (instead of solder islands) have to be repositioned to align with gaps only. Otherwise, solder will short the two terminals 540. These cells 1000 have temporary adhesive 610 resident in the indicated locations. This orientation may be accomplished using one or more of the following techniques: use of temporary adhesive 610; use of injection molding; and/or use of a pre-deposited solder frame.

Referring to FIG. 11, this figure illustrates that the face up approach as in FIG. 10 can facilitate testing 1120. In this example, the cell 1000-1 has two probes 1110-1 and 1110-2 that are used to contact the corresponding terminals 540-1, 540-2. The cells 1000-1 and 1000-2 are shown after the temporary adhesive 610 has been removed from "top" surface 131 of the substrate 130 and from around the terminals 540-1 and 540-2. The probes 1110 can therefore be used to test the microbattery. Laser release 1030 is also shown, resulting in separated microbatteries, of which a microbattery 1090 is shown.

Although in the above embodiments, the terminals 540 and corresponding through-vias 110 are illustrating being on a same side (the side with the substrate 130, this is merely exemplary. The terminals 540 (e.g., and corresponding through-vias 110) could be on opposite sides or even on sides that are perpendicular to each other.

In the foregoing description, numerous specific details are set forth, such as particular structures, components, materials, dimensions, processing steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or processing steps may have been omitted or may have not been described in order to avoid obscuring the presented embodiments. It will be understood that when an element as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

What has been shown includes the following in various embodiments:

A solder molded thin-film Li-battery (e.g., thickness: 0.01 mm-1 mm);

A temporary handler approach for solid state thin-film microbattery;

Use of low-temperature solder molding to avoid thermal impact to thin-film Li-microbattery;

Use of pre-formed solder foil to ovennold a microbattery;

Use of IMS to pre-deposit patterned solder to transfer and overmold a microbattery;

Use of IMS and LCP overmold or injection mold to provide environmental and bio compatible encapsulation, which supports low/no $O_2$ and $H_2O$ transport with IMS and environmental and bio compatible package with LCP; and/or Use of pre-patterned adhesive for temporary bonding of a thin-film Li-microbattery.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A microbattery, comprising:
a microbattery structure formed in a stack, the stack comprising multiple surfaces fashioned using multiple layers, the multiple layers including a substrate layer and a cover plate layer, a face side of the multiple surfaces being a surface of the substrate layer, a second side of the multiple surfaces being a surface of the cover plate layer, the face and second sides on opposite sides of the stack, and side surfaces of the multiple surfaces being opposite edges of the stack spanning between the surfaces of the first and second layers;
a first terminal on the face side and coupled to an anode of a battery in the microbattery structure;
a second terminal on the face side and coupled to a cathode of the battery in the microbattery structure; and
a metal-containing film covering the side surfaces, at least a portion of the second surface adjacent the edges, and a portion of the face layer of the stack but not covering the first or second terminals.

2. The microbattery of claim 1, wherein the metal-containing film comprises solder.

3. The microbattery of claim 1, wherein:
the stack comprises layers of the substrate, a polymer, and the cover plate, and the second side is completely covered by the metal-containing film;
the stack has a length between the face and second sides and the layers are parallel along the length;
the metal-containing film comprises a metal;
a solder film covers surfaces of the metal-containing film; and the substrate on the face side has part of its surface not covered by the metal-containing film or the solder film, the part comprising the first and second terminals.

4. The microbattery of claim 1, wherein:
the stack comprises layers of the substrate, a polymer, and the cover plate, and the second side is completely covered by the metal containing film;
the stack has a length between the face and second sides and the layers are parallel along the length;
the metal-containing film comprises a metal;
a solder film covers surfaces of the metal-containing film;
a polymer covers surfaces of the solder film;
the substrate on the face side is at least partly covered with adhesive, and the part covered with adhesive on the face side comprises the first and second terminals coupled to through-vias that extend through the substrate layer;
a polymer film covers surfaces of the solder film and a surface of the adhesive opposite a surface of the adhesive that covers the substrate; and
openings are formed in the polymer film to uncover at least a portion of corresponding terminals.

5. The microbattery of claim 4, wherein the openings are filled with a conductor.

6. The microbattery of claim 1, wherein:
the stack comprises layers of the substrate, a polymer, and the cover plate, and the second side is completely covered by the metal-containing film;
the stack has a length between the two sides and the layers are parallel along the length;
the metal-containing film comprises solder; and
the metal-containing film covers the portion of the substrate and a rest of the substrate has a surface not covered by the metal-containing film and including the first and second terminals.

7. The microbattery of claim 1, wherein a thickness of the microbattery ranges in thickness from 0.01 mm to 1 mm.

8. The microbattery of claim 1, wherein the metal-containing film covering the portion of the face side, but not the first or second terminals, covers parts of the first side adjacent the edges.

9. The microbattery of claim 8, wherein the metal-containing film covering the portion of the face side, but not the first or second terminals, is contiguous around corners of the side surfaces from the side surfaces to the parts of the face side that are covered and that are adjacent the edges.

10. The microbattery of claim 1, wherein the metal-containing film covering the at least a portion of the second side adjacent the edges is contiguous around corners of the second side from the side surfaces to the parts of the second side that are covered and that are adjacent the edges.

11. The microbattery of claim 1, wherein the second side has a part, not covered by the metal-containing film, that comprises adhesive.

12. The microbattery of claim 11, herein the metal-containing film covering the portion of the face side, but not the first and second terminals, covers parts of the first side adjacent the edges, wherein the face side has a part, not covered by the metal-containing film, that comprises adhesive and contains the first or second terminals.

* * * * *